United States Patent [19]

Beach

[11] 4,119,987
[45] Oct. 10, 1978

[54] SHUTTER RELEASE MECHANISM

[75] Inventor: David Easton Beach, Penfield, N.Y.

[73] Assignee: Eastman Kodak Company, Rochester, N.Y.

[21] Appl. No.: 797,100

[22] Filed: May 16, 1977

[51] Int. Cl.$^2$ .................. G03B 17/38; G05G 1/04
[52] U.S. Cl. ........................... 354/268; 74/2; 74/522
[58] Field of Search ............ 354/48, 207, 209, 266, 354/268; 74/2, 522

[56] References Cited

U.S. PATENT DOCUMENTS

| 2,791,164 | 5/1957 | Faulhaber | 354/204 |
| 3,094,051 | 6/1963 | Hutchison, Jr. et al. | 354/28 |
| 3,690,228 | 9/1972 | Yamashita et al. | 354/49 |
| 3,824,612 | 7/1964 | Uno et al. | 354/266 |

Primary Examiner—Michael L. Gellner
Attorney, Agent, or Firm—Roger A. Fields

[57] ABSTRACT

In a camera, a shutter release member is pivotally connected to a motion transmitting lever between respective end portions of the lever. One end portion of the lever normally contacts a removable fulcrum, and the other end portion contacts a restraining member provided for a shutter drive member. To initiate shutter actuation for picture-taking, the shutter release member is manually depressed to swing the lever about the removable fulcrum. The swinging lever moves the restraining member from a restraining position to a releasing position, freeing the drive member to actuate the camera shutter. To prevent unintended shutter actuation by inadvertently depressing the shutter release member, the fulcrum is removed from the lever. Then, manual depression of the shutter release member swings the lever about the restraining member, which is spring held in its restraining position to serve as an alternate fulcrum for the lever.

7 Claims, 4 Drawing Figures

SHUTTER RELEASE MECHANISM

BACKGROUND OF THE INVENTION

1. Field of the Invention

The present invention relates generally to shutter release mechanisms for cameras, and more particularly to shutter release mechanisms which can prevent undesired shutter actuation.

2. Description of the Prior Art

Those versed in the prior art dealing with shutter release mechanisms in still-picture cameras are aware of at least several alternate design approaches for preventing undesired shutter actuation using such release mechanisms. According to one design, a locking device is provided in a camera to block manual depression of a shutter release member by the camera user. The locking device blocks the shutter release member usually to prevent unintended double exposure or because there is too much or too little light to obtain a proper exposure. While such shutter release locking devices have been available for many years, the difficulty with many of their commercial embodiments is that they can cause camera damage through undue pressure being applied to the shutter release member by the camera user.

Another known design for preventing undesired shutter actuation calls for the camera to display a visual signal in its viewfinder during the initial stage of manually depressing the shutter release member. The signal is displayed when the level of available light is unsuitable for a proper exposure. The disadvantage of this design is that the visible signal is not a positive means for preventing shutter actuation. That is, the camera user may fail to observe the visible signal or forget about its appearance in the viewfinder when depressing the shutter release member.

A third design which has been recently devised is intended for use in automatic exposure cameras. According to this approach, which is disclosed in U.S. Pat. No. 3,690,228, granted Sept. 12, 1972, the shutter release member is normally connected by way of an interlocking member to a latch member which operates to restrain a shutter drive member. During the initial stage of manually depressing the shutter release member, the position of an exposure meter pointer is detected by mechanical means. If the pointer is located outside an automatic exposure range, the interlocking member is disconnected from the shutter release member and the latch member. As a result, the release member cannot actuate the camera shutter even though still able to be depressed. While this more recent design may be considered in some ways to represent an improvement over the other prior art examples discussed, it suffers from the possibility of mechanical failure because of the detailed mechanical relation between the exposure meter pointer and the means for disconnecting the interlocking member from the shutter release and latch members.

SUMMARY OF THE INVENTION

These and other problems associated with shutter release mechanisms are solved in accordance with the present invention. In the shutter release mechanism of the present invention, to initiate shutter actuation a shutter release member is manually depressed to swing a motion transmitting lever about a removable fulcrum support. The swinging lever moves a restraining or control member which is provided for a shutter drive member from a restraining position to a releasing position, freeing the drive member to actuate the camera shutter. On the other hand, to prevent undesired shutter actuation, as for example by inadvertently depressing the shutter release member, the fulcrum support is removed from the lever, which in effect is then disabled. As a result, manually depressing the release member will simply depress the lever without moving the restraining member to initiate shutter actuation.

According to a preferred embodiment of the present invention, the shutter release member is pivotally connected to the motion transmitting lever between opposite end portions of the lever. The end portions of the lever are respectively disposed in registry with the removable fulcrum support and the restraining member provided for the shutter drive member. A spring urges the restraining member, which is pivotally mounted, to its restraining position for holding the drive member in a cocked state. As a result of this relatively simple mechanical arrangement, when the shutter release member is manually depressed, the lever will swing about the fulcrum support to pivot the restraining member in opposition to the spring from its restraining position to its releasing position, enabling shutter actuation by the drive member. On the other hand, if the fulcrum support is removed from the lever, as for example in response to shutter actuation or the sensing of unsuitable light conditions for a proper exposure, the lever in effect will be disabled. That is, depressing the shutter release member will then swing the lever about the restraining member to prevent the lever from moving the restraining member to its releasing position. The fulcrum support may be returned to its supporting relation with the lever in response to advancement of a new film frame into position for exposure.

BRIEF DESCRIPTION OF THE DRAWING

For a more complete understanding of the present invention, as well as further advantages and features thereof, reference should be had to the following detailed description of the invention taken in conjunction with the accompanying drawing, in which.

DESCRIPTION OF THE PREFERRED EMBODIMENT

Figure 1:
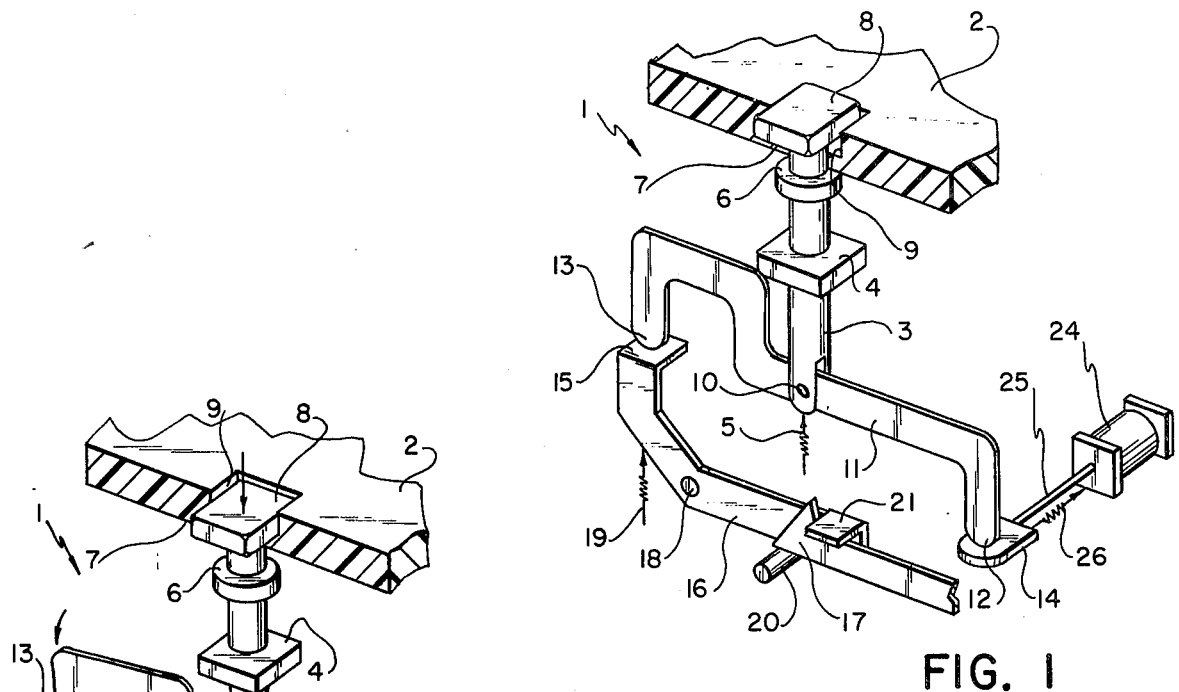
FIG. 1 is a perspective view of a shutter release mechanism in accordance with a preferred embodiment of the present invention, showing such release mechanism in condition for initiating shutter actuation.
Figure 2:
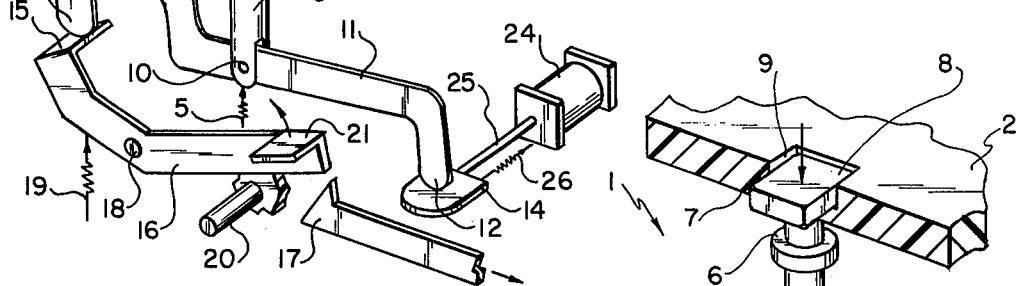
FIG. 2 is a perspective view similar to FIG. 1, showing operation of the release mechanism to effect shutter actuation.

Referring now to the drawing and in particular to FIG. 1, there is shown a shutter release mechanism, generally indicated by the reference numeral 1. FIG. 1 shows the various members of the shutter release mechanism in their relative positions for initiating shutter actuation. As illustrated, the release mechanism 1 is located within a camera body 2, partially shown. A manually depressible shutter release member 3 is vertically movable, as viewed in FIG. 1, through the centered opening in a block-line support 4 integrally formed with the camera body 2. To hold the release member 3 in its illustrated normal or raised position, a compression spring 5 urges the release member upwardly until a collar 6 encircling the release member abuts against an underside 7 of the camera body 2. The upper end of the shutter release member 3 is capped by a shutter release button 8, which is partially received in a complementary recess 9 in the camera body 2. The lower end of the release member 3 is pivotally connected by a pin-type coupling 10 to a motion transmitting lever 11. The coupling 10 is preferably located approximately midway between opposite finger-like end portions 12 and 13 of the lever 11. As can be seen in FIG. 1, the lever end portions 12 and 13 are respectively seated on a removable fulcrum support 14 and the tab-like extension 15 of a restraining or control member 16, which is provided for a conventional shutter drive member 17. The restraining member 16 is mounted for swinging movement about a pivot 18 between a restraining position for holding the drive member 17, as shown in FIG. 1, and a releasing position for freeing the drive member, as shown in FIG. 2. As viewed in FIG. 1, a compression spring 19 urges the restraining member 16 in a clockwise direction about the pivot 18 to its restraining position. In such position, the restraining member 16 is held in place against a fixed stop 20 by the compression spring 19, and a latch-like tab 21 of the restraining member holds the shutter drive member 17 in its illustrated cocked or charged state. When however, as shown in FIG. 2, the restraining member 16 is swung in a counterclockwise direction about the pivot 18 from its restraining position to its releasing position, the latch 21 will release the shutter drive member 17. Then, in a well known manner, the released drive member will momentarily open the camera shutter.

It will be realized, of course, that other arrangements between the restraining or control member 16 and the shutter drive member 17 can be devised for preventing shutter actuation. For example, the restraining member 16 may serve in its restraining position to directly block the camera shutter; whereas, the shutter drive member would take the form of spring means biasing the camera shutter for actuation. Then, movement of the restraining member 16 to its releasing position, out of the way of the camera shutter, would enable the spring means to actuate the camera shutter.

Figure 3:
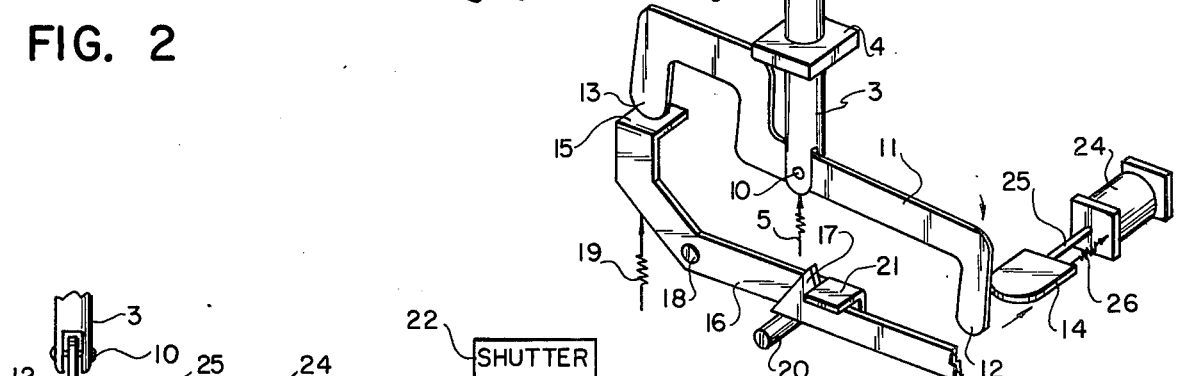
FIG. 3 is a perspective view similar to FIG. 1, showing operation of the release mechanism when it is desired to prevent shutter actuation.
Figure 4:
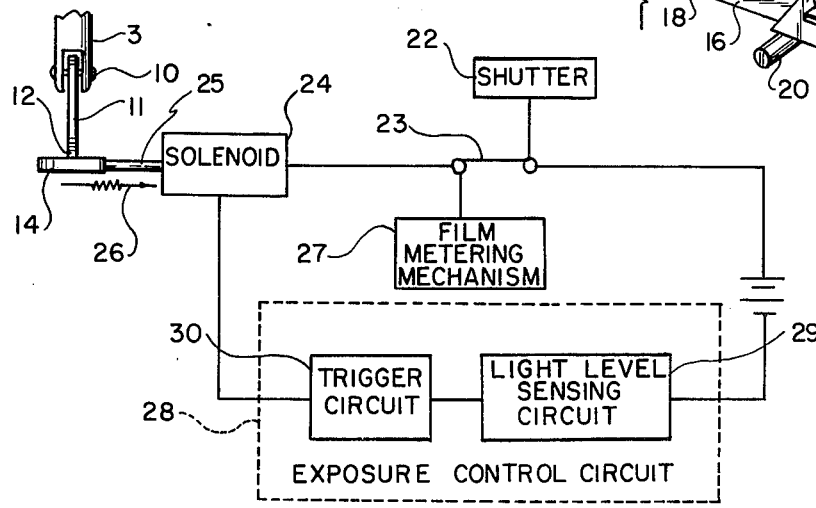
FIG. 4 is a block diagram of a schematically depicted electrical circuit for disabling the release mechanism to prevent shutter actuation.

Referring now to FIG. 4, there is schematically depicted in block diagram an electrical circuit whose components serve as means for moving the fulcrum support 14 into and out of supporting relation with end portion 12 of the lever 11. The electrical circuit is shown in the condition it would be immediately before actuation of the camera shutter 22, i.e., the condition of the shutter release mechanism 1 as shown in FIG. 1. When the shutter 22 is actuated to expose a film section, a normally closed switch 23, mechanically linked to the shutter, will be opened to deenergize a solenoid 24. Following deenergization of the solenoid 24, its armature 25 will be pulled in or moved to the right, as viewed in FIG. 4, by a tension spring 26. Since the solenoid armature 25 is connected to the fulcrum support 14, the fulcrum support will be moved from beneath the lever end portion 12, as in FIG. 3, to no longer support such end portion. When, however, it is desired to advance a new film section into position for exposure, a film metering or advancing mechanism 27 is manually driven. The actuated film metering mechanism 27, which is mechanically linked to the open switch 23, then closes the switch. During its movement, the film metering mechanism 27 may be employed, as is well known, the recock the shutter drive member 17 and the camera shutter 22.

An exposure control circuit 28 is depicted in FIG. 4 which includes a light level sensing circuit 29 and a voltage-sensitive trigger circuit 30. The arrangement of the light level sensing and trigger circuits 29 and 30 generally is well known. See, for example, U.S. Pat. No. 3,748,974, granted July 31, 1973. The light level sensing circuit 29 may include a photoresistive element disposed in series with a resistor, the resistor being disposed in parallel with the input stage of the voltage-sensitive trigger circuit 30. The photoresistive element and the resistor, in combination, constitute a voltage divider circuit which when switch 23 is closed, operates as follows. When scene brightness is above a given level, the voltage across the resistor is relatively high, causing a high level logic signal to be applied to the input of the trigger circuit 30. Such signal produces a high level logic signal at the output of the trigger circuit 30, which energizes the solenoid 24. The armature 25 of the energized solenoid 24 then moves out or to the left, as shown in FIG. 4, against the urging of the tension spring 26, to move the fulcrum support 14 beneath the lever end portion 12 to again support such end portion. On the other hand, when scene brightness is below the given level, the voltage across the resistor is relatively low, causing a low level logic signal to be applied to the input of the trigger circuit 30. Such signal produces a low level logic signal at the output of the trigger circuit 29. When this condition exists, the solenoid 24 cannot be energized to move the fulcrum support 11 beneath the lever end portion 12.

It will be appreciated that various other electrical or mechanical arrangements can be devised for moving the fulcrum support 14 into and out of supporting relation with the lever end portion 12. For example, the fulcrum support 14 could be normally maintained in supporting relation with the lever end portion 12, i.e., when the solenoid 24 is deenergized, and would be moved out of such relation by energization of the solenoid in response to actuation of the camera shutter 22 or the sensing of unsuitable light conditions for a proper exposure. According to another example, the fulcrum support 14 could be moved from beneath the lever end portion 12 directly by an impacting extension of the shutter 22; whereas, the fulcrum support could be returned to support the lever end portion directly by a driving extension of the film metering mechanism 27. In this example, of course, the solenoid device 24 would not be used.

Considering now the operational sequence of the shutter release mechanism 1 beginning with FIG. 1, when it is desired to actuate the camera shutter 22 the shutter release member 33 is manually depressed against the force of the compression spring 5 by bearing down on the button 8. Since the fulcrum support 14 is held in place beneath the lever end portion 12 by the energized solenoid 24, whereas the shutter restraining or control member 16 can be moved about its pivot 18, the lever 11 will be swung about the fulcrum support in a counterclockwise direction as viewed in FIG. 1 by the depressed shutter release member 3. The swinging lever 11 then pivots the restraining member 16 against the force of the compression spring 19 from its restraining position, shown in FIG. 1, to its releasing position, shown in FIG. 2. This, as was previously described, releases the shutter drive member 17 to initiate shutter actuation by impacting against the camera shutter 22.

The actuated shutter 22 opens the normally closed switch 23 in FIG. 4 to deenergize the solenoid 24. The deenergized solenoid 24 then removes the fulcrum support 14 from beneath the lever end portion 12, as shown in FIG. 3. Since the pivotally mounted lever 11 is no longer supported by the removed fulcrum support 14, the compression spring 19 will return the restraining member 16 from its releasing position, shown in FIG. 2, to its restraining position, shown in FIG. 1. At the same time, if the shutter release member 3 is released from being manually depressed, it will be returned by the compression spring 5 to its normal or raised position in which the collar 6 abuts against the camera body underside 7, as shown in FIG. 1. Then, as can be seen in FIG. 3, since the fulcrum support 14 is removed from the lever 11, if the shutter release member 3 is again manually depressed (after the shutter drive member 17 and the camera shutter 22 have been recocked) the release member will simply depress the lever without actuating the camera shutter. That is, depressing the release member 3 will swing the pivotally mounted lever 11 in a clockwise direction, as viewed in FIG. 3, about tab 15 of the restraining member 16, such tab then serving as an alternate fulcrum support for the lever. The lever 3 will not move the restraining member 16 to its releasing position since the restraining member is biased in place by the spring 19. When it is desired, however, to again actuate the camera shutter 22, the fulcrum support 14 must first be moved beneath the lever end portion 12. This, as was previously described, is accomplished by energizing the solenoid 24 in response to the sensing of scene brightness at a level suitable for effecting proper exposure, after a new film section has been advanced by the film metering mechanism 27 into position for exposure.

The present invention has been described in detail, with particular reference to a preferred embodiment thereof, however, it should be understood that variations and modifications can be effected within the spirit and scope of the present invention.

I claim:

1. A shutter release mechanism for a camera, comprising:
   a motion transmitting lever;
   a fulcrum in contact with said lever for pivotally supporting said lever;
   a shutter control member mounted for movement by said lever from a restraining position in which shutter actuation is prevented to a releasing position in which shutter actuation is allowed;
   means for moving said fulcrum out of contact with said lever to discontinue its pivotal support of said lever; and
   manually operable means, operable only when said fulcrum contacts said lever, for pivoting said lever about said fulcrum to move said shutter control member from its restraining position to its releasing position.

2. A shutter release mechanism for a camera, comprising:
   a motion transmitting lever;
   a fulcrum in contact with said lever for pivotally supporting said lever for movement along an arcuate path;
   a shutter control member located in said arcuate path and mounted for movement by said lever from a restraining position in which shutter actuation is prevented to a releasing position in which shutter actuation is allowed;
   means for moving said fulcrum out of contact with said lever to discontinue its pivotal support of said lever; and
   manually operable means, operable only when said fulcrum is in contact with said lever, for moving said lever along said arcuate path to move said shutter control member from its restraining position to its releasing position and, operable only when said fulcrum is not in contact with said lever, for moving said lever along a different path to avoid moving said shutter control member to its releasing position.

3. A shutter release mechanism for a camera as recited in claim 2, wherein said means for moving said fulcrum includes means for coupling said fulcrum and an actuatable shutter in the camera for moving said fulcrum out of contact with said lever in response to shutter actuation, thereby to prevent double exposure.

4. A shutter release mechanism for a camera, comprising:
   a motion transmitting lever;
   a fulcrum in contact with said lever for pivotally supporting said lever;
   means for moving said fulcrum out of contact with said lever to discontinue its pivotal support of said lever;
   a shutter control member mounted for movement by said lever from a restraining position in which shutter actuation is prevented to a releasing position in which shutter actuation is allowed, said shutter control member being disposed to pivotally support said lever when said fulcrum is not in contact with said lever; and
   manually operable means, operable only when said fulcrum in contact with said lever, for pivoting said lever about said fulcrum to move said shutter control member from its restraining position to its releasing position, and operable only when said fulcrum is not in contact with said lever, for pivoting said lever about said shutter control member to avoid moving said control member to its releasing position.

5. A shutter release mechanism for a camera as recited in claim 4, wherein said shutter control member is pivotally mounted for movement between its restraining and releasing positions and is spring urged to the restraining position, and wherein said shutter control member includes means for releasably engaging a shutter drive member of the camera.

6. A shutter release mechanism as recited in claim 4 wherein said lever has respective end portions, a first one of which is seated on said fulcrum when said fulcrum pivotally supports said lever and a second one of which is seated on said shutter control member, and wherein said manually operable means includes a depressible shutter release member pivotally connected to said lever between its opposite end portions.

7. A shutter release mechanism for a camera, comprising:
   a motion transmitting lever having first and second portions spaced apart from each other along said lever;
   a fulcrum in contact with said first portion of said lever for pivotally supporting said lever at its first portion;

means for moving said fulcrum out of contact with said first portion of said lever to discontinue its pivotal support of said lever;

a shutter control member mounted for movement by said lever from a restraining position in which shutter actuation is prevented to a releasing position in which shutter actuation is allowed, said shutter control member in registry with said second portion of said lever to pivotally support said lever at its second position when said fulcrum is not contact with said first portion of said lever;

spring means for urging said shutter control member to its restraining position; and a depressible shutter release member pivotally connected to said lever between its first and second portions, said shutter release member being depressible when said fulcrum is in contact with said first portion of said lever for pivoting said lever about said fulcrum to move said shutter control member, in opposition to said spring means, from said restraining position to said releasing position and being depressible when said fulcrum is not in contact with said first portion of said lever for pivoting said lever about said shutter control member to avoid moving said control member to its releasing position.

* * * * *

UNITED STATES PATENT OFFICE
CERTIFICATE OF CORRECTION

PATENT NO. : 4,119,987
DATED : October 10, 1978
INVENTOR(S) : David E. Beach

It is certified that error appears in the above-identified patent and that said Letters Patent are hereby corrected as shown below:

Column 7, line 11 should read:

in contact with said first portion of said lever;

Signed and Sealed this

Twentieth Day of March 1979

[SEAL]

Attest:

RUTH C. MASON
Attesting Officer

DONALD W. BANNER
Commissioner of Patents and Trademarks